United States Patent [19]

Kondo

[11] 4,366,725
[45] Jan. 4, 1983

[54] ENGAGEMENT DEVICE FOR CONTROL CABLE

[75] Inventor: Kazuhiko Kondo, Kawanishi, Japan

[73] Assignee: Nippon Cable System, Inc., Takarazuka, Japan

[21] Appl. No.: 263,051

[22] Filed: May 13, 1981

Related U.S. Application Data

[63] Continuation of Ser. No. 31,915, Apr. 20, 1979, abandoned.

[30] Foreign Application Priority Data

Jan. 12, 1979 [JP] Japan .............................. 54/3275[U]

[51] Int. Cl.³ .............................................. F16C 1/10
[52] U.S. Cl. .................................................. 74/501 R
[58] Field of Search ......................... 74/501 R, 501 P; 248/295.1, 288.1, 296

[56] References Cited

U.S. PATENT DOCUMENTS 3,289,491 12/1966 Conrad .............................. 74/501 P
4,075,904 2/1978 Irwin et al. ........................ 74/501 P Primary Examiner—Kenneth Dorner
Attorney, Agent, or Firm—Armstrong, Nikaido, Marmelstein & Kubovcik

[57] ABSTRACT

An engagement device for a control cable comprising a connecting member having at one end an engagement hole for a fitting made of metal secured to the control cable and at the other end a threaded hole, and a fixing member having a threaded portion engageable to the threaded hole of the connecting member, the fixing member further having a fitting means so as to be engaged or pivoted at a specific position. The device can adjust the position of the end of the control cable on the side of a driven equipment over a large distance in the axial direction of the control cable.

4 Claims, 2 Drawing Figures

ENGAGEMENT DEVICE FOR CONTROL CABLE

This is a continuation of application Ser. No. 31,915, filed Apr. 20, 1979 and now abandoned.

BACKGROUND OF THE INVENTION

The present invention relates to a novel engagement device for a control cable, and more particularly to a control cable engaging device which is able to engage the end of the control cable on the side of a driven equipment adjustably in the axial direction.

Control cables which comprise a flexible conduit and an inner wire disposed slidably within the conduit are used in remote control of various mechanisms in machines or equipments in industry. A fitting made of metal is secured onto the end of conduit. One end of the inner wire is connected to a driven equipment and the other end to a drive equipment. In pushing and pulling operations of the control cable, two rods which are generally connected to both ends of the inner wire can slide within a guide pipe connected to the fitting.

In thus constructed control cables, when the end of the conduit is engaged to the driven equipment, it is required to connect the end of the inner wire to the driven equipment in great precision so as to ensure stable and reliable operation of the control cable. Conventionally the connection of the end of the inner wire to the driven equipment is conducted by bringing the end of the inner wire close to or alternatively keeping it away from the driven equipment.

It is required to adjust the length of the inner wire not only in mounting of the control cable but also in amending the length of the inner cable due to change on standing.

Adjusting devices of this type as are known in the art are so constructed that the fitting having an annular groove formed on the peripheral surface thereof is inserted into a tubular fixing member which has a plurality of holes extending vertically to the axial direction and a plurality of pins are so inserted to the holes that the fitting is secured to the fixed member. Thus constructed devices have disadvantages that the strength of the fixing member is reduced greatly due to the provision of the holes and the engagement position of the fitting is controlled only in two or three points due to the reduction in the strength of the fixing member. Further, the devices have another disadvantage that the range of engagement capable of controlling is very small. Therefore, the control cables employing these adjusting devices cannot be operated stably and reliably for a long period of time.

OBJECTS OF THE INVENTION

An object of the present invention is to provide a novel engagement device for a control cable which can adjust the position of the end of the control cable on the side of a driven equipment precisely over a large distance in the axial direction, by which the end of the control cable can be connected precisely to a driven equipment.

Other object of the invention is to provide a novel engagement device for a control cable which can amend change on standing in the length of an inner wire.

Other objects of the invention will become apparent from the following description given with reference to the accompanying drawings.

DETAILED DESCRIPTION

Figure 1:
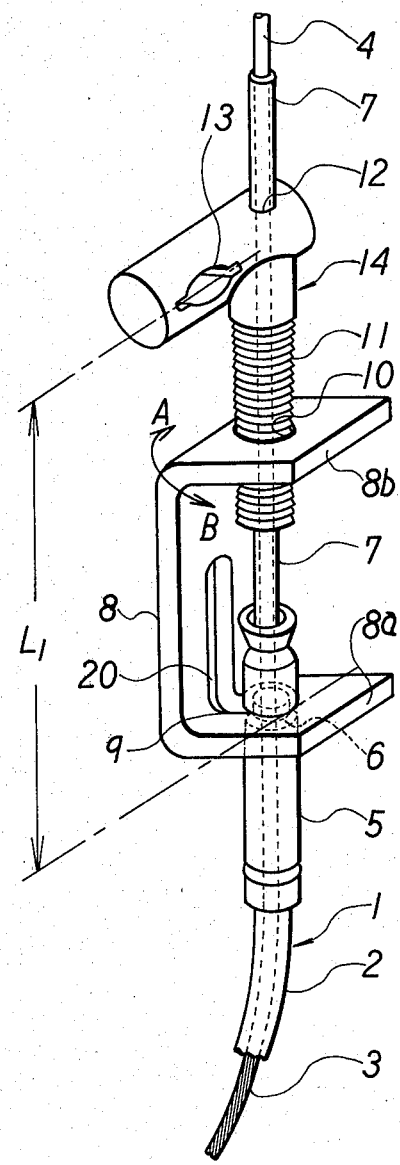
FIG. 1 is a perspective view showing an embodiment according to the present invention, to which a control cable is secured.

Referring first to FIG. 1 showing the embodiment of the invention, numerals 1 and 2 designate a control cable and a flexible conduit, respectively, while numeral 3 designates an inner wire disposed slidably within the conduit 2. A rod 4 is connected to the end of the inner wire 3. A fitting 5 made of metal having an annular groove 6 formed in the peripheral surface thereof is connected to an end of the conduit 2.

The rod 4 is inserted into the guide pipe 7 connected flexibly to the fitting 5 and is driven by the pushing and pulling operations of the inner wire 3 in the axial direction to operate a driven equipment (not shown).

Numeral 8 is a connecting member 8 having U-shape in section in which an engagement hole 9 for the annular groove 6 of the fitting 5 is formed in the end 8a. The connecting member 8 is connected through the engagement hole 9 to the conduit 2. A threaded hole 10 is formed with the other end 8b of the connecting member 8 at the position front to the engagement hole 9.

Numeral 14 is a fixing member comprising a threaded portion 11 engageable to the threaded hole 10 of the connecting member 8, a hole 12 in which a guide pipe is inserted and a fitting means such as a fitting hole 13 formed at the side relative to the hole 12. Numeral 20 is a cutaway portion for engaging the fitting 5 to the engagement hole 9.

The advantages and operations of the embodiment of FIG. 1 will be explained below.

By engaging the threaded portion 11 of the fixing member 14 into the threaded hole 10 of the connecting member 8, the distance $L_1$ from the fitting 5 to the fitting hole 13 of the fixing member 14 can be controlled freely.

When the fixing member 14 is secured or pivoted at a specific position through the fitting hole 13, the distance from the end of the conduit 2 to the fitting 13 is controlled freely by forcing the connecting member 8 to rotate in the direction A or B, by which the end of the rod 4 can be connected precisely to the driven equipment. further, the threaded portion 11 can be lengthened as occasion demands since there is nothing in the threaded portion 11 to reduce the strength thereof. Therefore, the end of the conduit can be positioned freely over a large range.

Further, the embodiment of the invention can engage the control cable 1 safely on which a large load is often applied, since the threaded portion 11 of the fixing member 14 is in the form of a tube.

Figure 2:
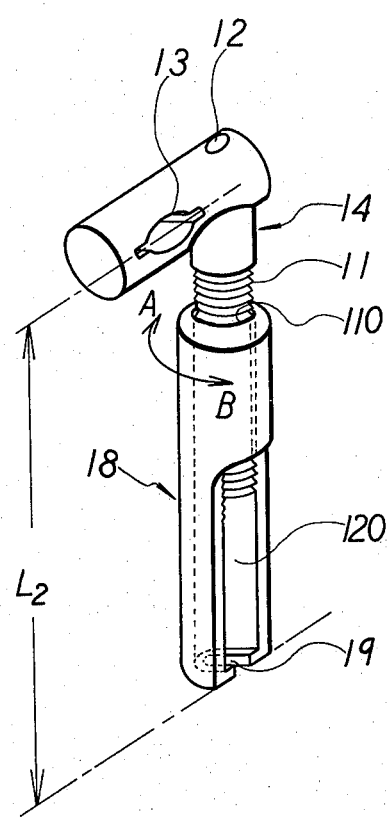
FIG. 2 is a perspective view showing another embodiment according to the invention.

In the embodiment shown in FIG. 2, a connecting member 18 is substantially in the form of a tube. The connecting member 18 is provided with a cutaway portion 120 engageable to a fitting of a conduit (not shown). Numeral 19 is a engagement hole formed at the end of the connecting member 18 which engages the same annular groove of the fitting as in the embodiment shown in FIG. 1. Numeral 110 is a threaded hole to which a threaded portion 11 is engaged. Numerals 12 and 13 are a hole provided in a guide pipe and a fitting hole, respectively. According to this construction, the distance $L_2$ from the fitting hole 13 to the end of the connecting member 18 can be controlled freely and finely.

The advantages and operations of the embodiment shown in FIG. 2 including the connecting member 18 are the same as those in the embodiment shown in FIG. 1.

Control cables employing the engagement device according to the present invention can be operated reliably and stably for a long period of time.

It is to be understood that the invention is not limited in its application to the details of construction and arrangement of parts set forth in the above general description or illustrated in the accompanying drawings, since the invention is capable of other embodiments and of being practiced or carried out in various ways. Also, it is to be understood that the phraseology or terminology employed herein is for the purpose of description and not limitation.

What is claimed is:

1. A device for engaging the end of a control cable having a central cable wire adapted for axial movement and a conduit therearound for sliding engagement with said central cable wire which comprises a fitting for engagement with said conduit and having an annular groove on the peripheral surface thereof, a connecting member having a threaded hole adjacent one end portion and, adjacent its other end portion, a receiving means for slidably receiving said fitting in a direction transversely of the longitudinal cable axis, said receiving means including a cutaway portion to receive said fitting and hold the control cable against axial movement with respect to said connecting member while the control cable is axially alined with said threaded hole, and a fixing member having threaded portion thereon for threaded engagement in said threaded hole of said connecting member, a guide hole therethrough to permit passage of an activating rod connected to said central cable wire, and a radially extending portion thereon adapted to rotate with respect to said connecting member and thereby adjust the position of said fixing member.

2. The device of claim 1, wherein the threaded portion of the fixing member is in the form of a tube.

3. The device of claim 1 or 2, wherein the connecting member has a U-shape in section.

4. The device of claim 1 or 2, wherein the connecting member has a partially cutaway portion and is substantially in the form of tube.

* * * * *